Nov. 29, 1966  R. E. SMITH  3,287,992
ACCELERATOR PEDAL FOR MOTOR VEHICLES
Filed Dec. 11, 1964
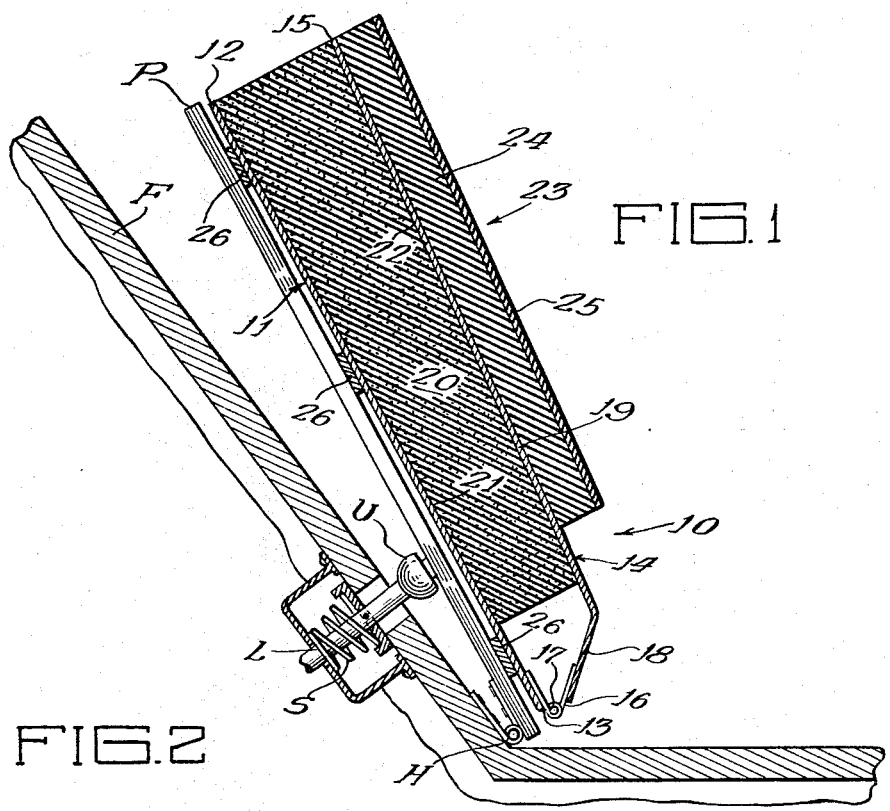
FIG.1
FIG.2
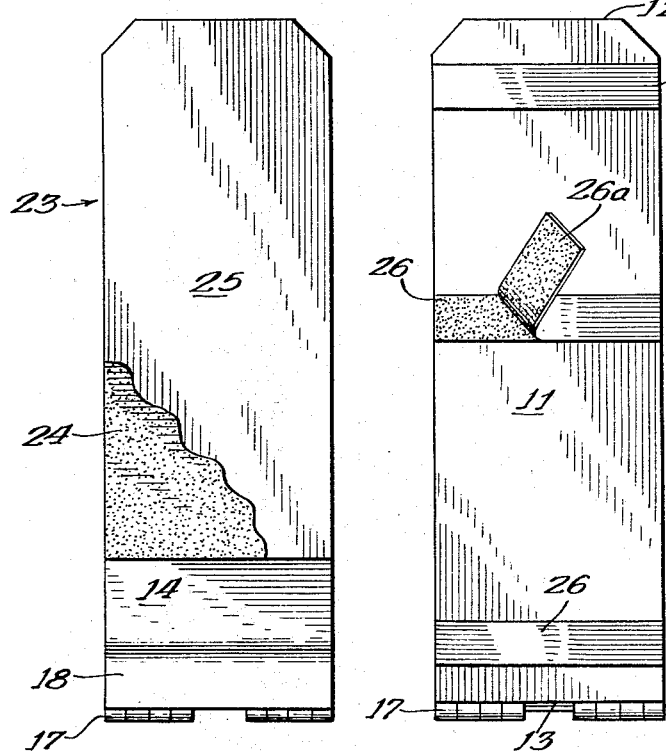
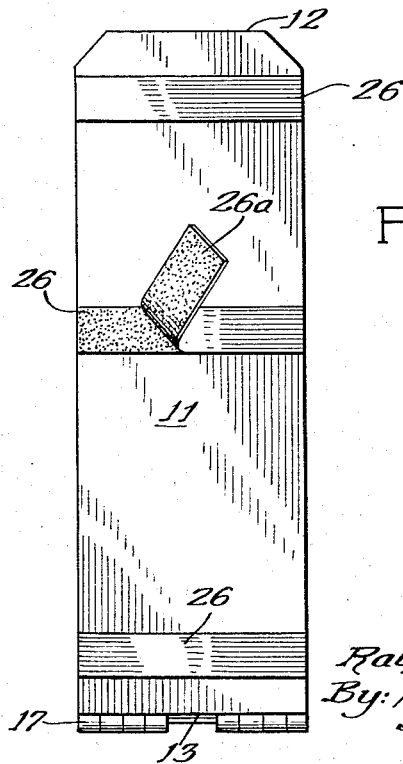
FIG.3
Inventor:
Ralph E. Smith
By: Hofgren, Wegner, Allen,
Stellman & McCord
Attorneys

United States Patent Office 3,287,992
Patented Nov. 29, 1966

3,287,992
ACCELERATOR PEDAL FOR MOTOR VEHICLES
Ralph E. Smith, 1307 Devon Ave., Park Ridge, Ill.
Filed Dec. 11, 1964, Ser. No. 417,621
12 Claims. (Cl. 74—562)

This invention relates to an improvement in accelerator pedals for motor vehicles, and may be either a modified original equipment structure or an accessory which may be readily secured to an automobile accelerator pedal.

Modern automobile accelerator pedals customarily comprise a rectangular rigid metal plate which is hinged toward the rear, or heel end, on the floor board; and such pedals usually have a ball and socket, or other universal joint, connection between a more forward portion and a link which is one end of a linkage system by which accelerator pedal motion is transmitted to the carburetor. A spring normally holds the forward end of the accelerator pedal in an elevated position and resists downward pressures on the accelerator which acts through the linkage to operate the carburetor valves. A relatively stiff rubber pad is provided on the accelerator pedal, and it is intended principally to provide a generally non-skid surface and to protect the accelerator pedal from contact with wet shoe soles and the like which might corrode it. The rubber accelerator pedal cover provide almost no cushioning effect.

The device of the present invention provides a very soft cushion structure which may be incorporated into the accelerator pedal of a motor vehicle at the factory, or which may be sold in the form of an accessory for attachment to an accelerator pedal without modification of the pedal itself.

The structure includes a base plate having front and rear ends, means for connecting the base plate to the accelerator linkage so that movement of the plate acts on the linkage without substantial lost motion, an upper rigid plate having front and rear ends, means hingedly connecting the rear end of the upper plate to the rear end of the lower plate, a block of soft resilient material between the plates, means for securing the block of material to both the plates, and a pedal pad secured to the upper surface of the upper plate.

The block of soft resilient material between the plates is preferably adhesively bonded to both plates; and likewise the pedal pad on the upper surface of the upper plate is preferably a relatively thin strip of soft resilient material which is adhesively secured to the upper plate, and is either water resistant or has a water resistant skin.

When the structure is incorporated into a new motor vehicle the base plate may take the place of a conventional accelerator pedal plate; while in the case of an accessory the base plate is fixedly secured to the existing rubber pedal surface, preferably by means of a plurality of strips of pressure sensitive adhesive on the underside of the plate.

In a preferred form, the upper plate includes two portions which form an obtuse angle with respect to one another, and the two portions consist of a short section which extends upwardly from the hinge means at a large angle with respect to the base plate and a long section which is at a very small angle with respect to the base plate.

Experimental operation of a motor vehicle equipped with the accelerator pedal accessory herein disclosed shows that the accessory, by interposing a soft cushion between the driver's foot and the accelerator pedal, produces a marked increase in gasoline mileage, especially in passenger vehicles in which the carburetor has high speed jets which respond to sudden downward pressure on the accelerator pedal to provide a sharp increase in the volume of combustible mixture entering the carburetor. The device of the present invention has very little noticeable effect upon the rate of acceleration of a motor vehicle, but instead acts to smooth the downward movement of the accelerator pedal when the driver presses down with his foot.

In addition to increasing gasoline mileage, the device of the present invention also improves the handling characteristics of a vehicle on ice or snow, by making it easier for the driver to obtain a smooth and even increase in the application of foot pressure to the accelerator linkage.

The structure of the present invention also tends to reduce foot and leg fatigue and muscle strain in long drives, because it is easier with the soft cushion structure to retain the accelerator pedal at a predetermined point than it is to do so merely with the resistance of the accelerator pedal spring.

Finally, the soft, cushioned accelerator pedal provides a very good feel beneath the driver's foot, and thus actually increases the ease and pleasure of driving, particularly during long trips.

The invention is illustrated in a preferred embodiment in the accompanying drawings, in which:

FIG. 1 is a side elevational view of the invention embodied in an accessory which is secured to a motor vehicle accelerator pedal;

FIG. 2 is a top plan view of the device of FIG. 1 with a part broken away; and

FIG. 3 is a bottom plan view.

Referring to the drawings in greater detail, and referring first to FIG. 1, a motor vehicle is provided with a floor board F, and an accelerator pedal P forms a lower rigid plate which is pivoted at the rear, or heel end by means of a hinge H. Forward of the hinge is a universal joint connection U to a link L of an accelerator linkage by means of which movement of the pedal about the hinge H is transmitted to the carburetor. An accelerator spring assembly S urges the accelerator pedal upwardly toward idling position.

The device of the present invention, which is indicated generally by the reference numeral 10, consists of a rigid rectangular base plate 11 having a front end 12 and a rear end 13; a rigid rectangular upper plate 14 that has a front end 15 and a rear end 16; and a hinge 17 which pivotally connects the rear end of the upper plate 14 to the rear end of the base plate 11. The upper plate includes two portions 18 and 19 which form an obtuse angle with respect to one another, with the portion 18 consisting of a short section that extends upwardly from the hinge 17 at a large angle with respect to the base plate 11, while the second portion 19 consists of a long section which is at a very small angle with respect to the base plate.

FIG. 1 shows that the length of the device from the hinge 17 to the front ends 12 and 15 of the plates is only slightly less than the length of the accelerator pedal P, while FIG. 2 shows that the width of the structure is substantially equal to that of the accelerator pedal P. When constructed as an accessory, the unit is made as wide as possible without interfering with a power brake pedal of a motor vehicle, many of which are placed very close to the accelerator pedal.

A block 20 of soft, resilient material is positioned between base plate 11 and upper plate 14, and is secured to the base plate and the upper plate, preferably by bonding with layers of adhesive 21 and 22, respectively. The block 20 may be soft foam rubber, or a soft foamed plastic, and has its lower and upper surfaces diverging so that, in an actual structure embodying the invention, the block 20 is about 1⅔ inch thick at the front end of the device, and about 1¹⁄₁₀ inch thick toward the hinge. A satisfactory material is pin core foam rubber of the type used in chair cushions. The block 20 provides resilient means biasing the upper plate 14 toward an elevated position when the upper plate is depressed.

Surmounting the second portion 19 of the upper plate, and bonded thereto by an adhesive layer, is a pedal pad indicated generally at 23 in the form of a strip or layer of soft, resilient material 24, which may be foam rubber or foam plastic, with an impervious top skin 25 to prevent the foam rubber or foam plastic strip 24 from absorbing water that may be on the sole of the driver's shoe. A suitable material for strip 24 is a commercially available closed cell foam which has the cells filled with an inert gas, such as nitrogen. Alternatively, the pedal pad may be formed from material which is either water-proof or has a protective skin on all sides. In an experimental unit embodying the invention, the layer 24 is ½" thick, and the waterproof skin 25 is about 1/20" thick.

On the bottom of the base plate 11 are strips 26 of pressure sensitive adhesive by means of which the entire structure 10 may be adhesively secured to an accelerator pedal P. As a matter of convenience in fabrication, the strips 26 may be a commercially available strip material having pressure sensitive adhesive on both faces and removable protective masks 26a on both faces, so that in manufacture of the accessory the protective mask is removed from one face to adhere the strips to the base plate 11, and the purchaser of the device then removes the protective mask from the outer surface of each strip 26 when he is ready to secure the accessory device 10 to the accelerator pedal of his motor vehicle.

In order for the device to function in the described manner, by cushioning and smoothing the downward movement of the accelerator pedal, it is apparent that the soft cushion block 20 must be softer—i.e., less resistant to compression, or less stiff—than is the accelerator spring S, so the cushion and the spring act in series. Initial foot movement is taken up by the cushion and only after the cushion has been compressed a predetermined amount does the accelerator spring S begin to compress and permit movement of the linkage L.

It is perfectly clear that if the device is to be used as an improved accelerator pedal assembly in new motor vehicles, the accelerator pedal P can be eliminated, and the base plate 11 substituted for it with a direct connection from the base plate 11 to the hinge H and with the universal joint U to receive the accelerator link L fastened directly to the bottom of the base plate 11.

The foregoing detailed description is given for clearness of understanding only and no unnecessary limitations should be understood therefrom, as modifications will be obvious to those skilled in the art.

I claim:

1. In an acceleator pedal for a motor vehicle having an accelerator linkage to the carburetor, in combination: a lower rigid plate hinged to a fixed part of the vehicle and having front and rear ends; means for connecting said lower plate to the accelerator linkage so that movement of the plate about its hinge acts on the linkage without substantial lost motion; an upper rigid plate having front and rear ends; means hingedly connecting said upper plate to said lower plate; a block of soft, resilient material beneath said upper plate; and means securing said block of material to one of said plates.

2. The combination of claim 1, in which the means securing the block of soft, resilient material to said one of said plates comprises an adhesive.

3. The combination of claim 1, which includes a pedal pad in the form of a strip of soft, resilient material which is adhesively secured to the upper plate and has a water resistant top surface.

4. The combination of claim 1, in which the lower plate is planar, and the upper plate includes two portions which form an obtuse angle with respect to one another, said two portions consisting of a short section extending upwardly from the hinge means at a large angle with respect to the lower plate and a long section which is at no more than a very small angle with respect to the lower plate.

5. An attachment for an automobile accelerator pedal comprising, in combination: a base plate having front and rear ends, said base plate being substantially the same breadth as an accelerator pedal; an upper rigid plate having front and rear ends, said upper plate being substantially the same length and breadth as an accelerator pedal; means hingedly connecting the rear end of the said upper plate to the rear end of said base plate; a block of soft, resilient material beneath said upper plate; means securing said block of material to one of said plates; a pedal pad secured to the upper surface of the upper plate; and means for securing said attachment to a motor vehicle accelerator pedal.

6. The combination of claim 5, in which the latter securing means comprises strips of pressure sensitive adhesive on the underside of the base plate adjacent the rear and the front ends thereof.

7. The combination of claim 5, in which the means securing the block of soft, resilient material to said one of said plates comprises an adhesive.

8. The combination of claim 5, in which the pedal pad is a strip of soft, resilient material which is adhesively secured to the upper plate and has a water resistant top surface.

9. The combination of claim 5, in which the base plate is planar, and the upper plate includes two portions which form an obtuse angle with respect to one another, said two portions consisting of a short section extending upwardly from the hinge means at a large angle with respect to the base plate and a long section which is at no more than a very small angle with respect to the base plate.

10. The combination of claim 5 in which the upper and base plates are substantially the same size, and the block of soft, resilient material is secured to both said plates.

11. In an accelerator pedal assembly for a motor vehicle having an accelerator linkage to the carburetor, in combination: a lower rigid plate hinged to a fixed part of the vehicle and having front and rear ends; means connecting said lower plate to the accelerator linkage so that movement of the plate about its hinge acts on the linkage without substantial lost motion; first resilient means of predetermined stiffness biasing said lower plate and linkage toward an elevated position; an upper rigid plate, means hingedly connecting the upper rigid plate to the lower rigid plate; and second resilient means of less stiffness than said first resilient means secured to one of said plates and biasing the upper plate toward an elevated position when said upper plate is depressed, so that said second resilient means compresses before the first resilient means when the pedal assembly is depressed and thus cushions the application of compressive force to the first resilient means, whereby the accelerator linkage to the carburetor is cushioned against abrupt movement.

12. The combination of claim 11 which includes a base plate, and means securing the base plate to the top surface of the lower plate.

References Cited by the Examiner
UNITED STATES PATENTS

| | | | |
|---|---|---|---|
| 1,875,399 | 9/1932 | Ritz Woller | 74—563 |
| 1,915,695 | 6/1933 | Ritz Woller | 74—513 |
| 2,040,866 | 5/1936 | Miller | 74—563 |
| 2,069,066 | 1/1937 | Harbour | 74—563 |
| 2,270,902 | 1/1942 | Rubissow | 74—563 X |
| 2,688,262 | 9/1954 | Bolton | 74—562 X |
| 2,825,418 | 3/1958 | Kershman | 74—513 X |
| 2,937,542 | 5/1960 | Mastrandrea | 74—563 |

FRED C. MATTERN, Jr., *Primary Examiner.*

BROUGHTON G. DURHAM, *Examiner.*

C. F. GREEN, *Assistant Examiner.*